United States Patent [19]

Fullemann

[11] Patent Number: 4,863,695

[45] Date of Patent: Sep. 5, 1989

[54] PIPETTE ASSEMBLY

[75] Inventor: James S. Fullemann, Half Moon Bay, Calif.

[73] Assignee: Hewlett-Packard Company, Palo Alto, Calif.

[21] Appl. No.: 43,739

[22] Filed: Apr. 28, 1987

[51] Int. Cl.[4] .......................... G01N 1/10; B01L 3/02

[52] U.S. Cl. .......................... 422/100; 422/63; 436/54; 436/180; 128/760; 128/763; 73/864.14

[58] Field of Search .................... 422/63, 100; 436/47, 436/180, 54; 128/760, 763; 73/864.14

[56] References Cited

U.S. PATENT DOCUMENTS

| | | | |
|---|---|---|---|
| 3,766,785 | 10/1973 | Smernoff | 73/864.14 |
| 3,918,308 | 11/1975 | Reed | 73/864.14 |
| 4,072,330 | 2/1978 | Brysch | 73/864.14 |
| 4,151,750 | 5/1979 | Suovaniemi et al. | 73/864.14 |
| 4,187,724 | 2/1980 | Citrin | 73/864.14 |
| 4,215,092 | 7/1980 | Suovaniemi et al. | 422/100 |
| 4,283,950 | 8/1981 | Tervamäki | 422/100 X |
| 4,343,418 | 8/1982 | Jurecic et al. | 73/864.14 |
| 4,418,580 | 12/1983 | Satchell et al. | 73/864.14 X |
| 4,435,989 | 3/1984 | Meyer et al. | 73/864.14 |
| 4,478,094 | 10/1984 | Salomaa et al. | 422/100 X |

*Primary Examiner*—Michael S. Marcus
*Assistant Examiner*—Lynn M. Kummert
*Attorney, Agent, or Firm*—Robert P. Sabath; Edward Y. Wong

[57] ABSTRACT

A pipette assembly for automatic pipetting machines including a pipette tip and a pipette tip holder having a mandrel and a seal. The mandrel includes a plug portion which is adapted to engage a top end portion of the pipette tip, and a cylindrical seat portion proximate its bottom end. The seal is a unitary, resilient member having a cylindrical base portion, an upwardly flaring skirt portion, and an opening receptive to the seat portion of the mandrel. An inner surface of the base portion of the seal is provided with a pair of sealing ribs, one of which serves as a pivot for the skirt portion.

12 Claims, 4 Drawing Sheets

PIPETTE ASSEMBLY

BACKGROUND OF THE INVENTION

1. Field of the Invention

This invention relates generally to apparatus for handling chemical and biological substances, and more particularly to automatic pipetting machines.

2. Description of the Related Art

Automatic pipetting machines are used in the chemical and biological fields to automatically pipette fluids from one place to another. To avoid contamination, many automatic pipetting machines use disposable pipette tips which are used once and then thrown away.

Commercially available automatic pipetting machines use several techniques for picking up and discarding disposable pipette tips. For example, several companies use custom molded pipette tips which are specifically designed for insertion and removal from their automatic pipetting machines. Other companies provide automatic pipetting machines which pick-up generic pipette tips with mandrels having "O" rings or hard, plastic plugs as sealing members.

While custom molded pipette tips work fairly well with the machines for which they were designed, they tend to be more expensive than generic pipette tips. On the other hand, automatic pipetting machines which use generic pipette tips experience problems including improper internal sealing, high insertion and removal forces, improper axial alignment, and unpredictable pipette tip heights.

SUMMARY OF THE INVENTION

An object of this invention is to provide a pipette assembly for automatic pipetting machines which uses generic pipette tips.

Another object of this invention is to provide a superior holder for generic pipette tips.

Briefly, the pipette tip holder of the present invention includes a hollow mandrel, and a seal engaging a bottom portion of the mandrel. The seal has a substantially hollow, cylindrical base portion with two internal sealing ribs, and a skirt portion which flares outwardly from the base portion. The base portion engages and seals to the bottom portion of the mandrel, while the skirt portion is adapted to engage and seal to an upper, inner surface of a pipette tip. The mandrel is provided with a shoulder to properly position the pipette tip.

An advantage of this invention is that the skirt portion of the seal can conform to a large range of pipette tip internal diameters.

Another advantage of this invention is that the vertical position of the pipette tips is ensured by the shape of the supporting mandrel.

Yet another advantage of this invention is that the seal provides for the automatic axial alignment of the pipette tips.

A still further advantage of this invention is that the pipette tip holder has low insertion, sealing, and removal forces.

These and other objects and advantages of the present invention will become apparent to those skilled in the art after reading the following descriptions and studying the various figures of the drawing.

DETAILED DESCRIPTION OF THE PREFERRED EMBODIMENT

Figure 1:
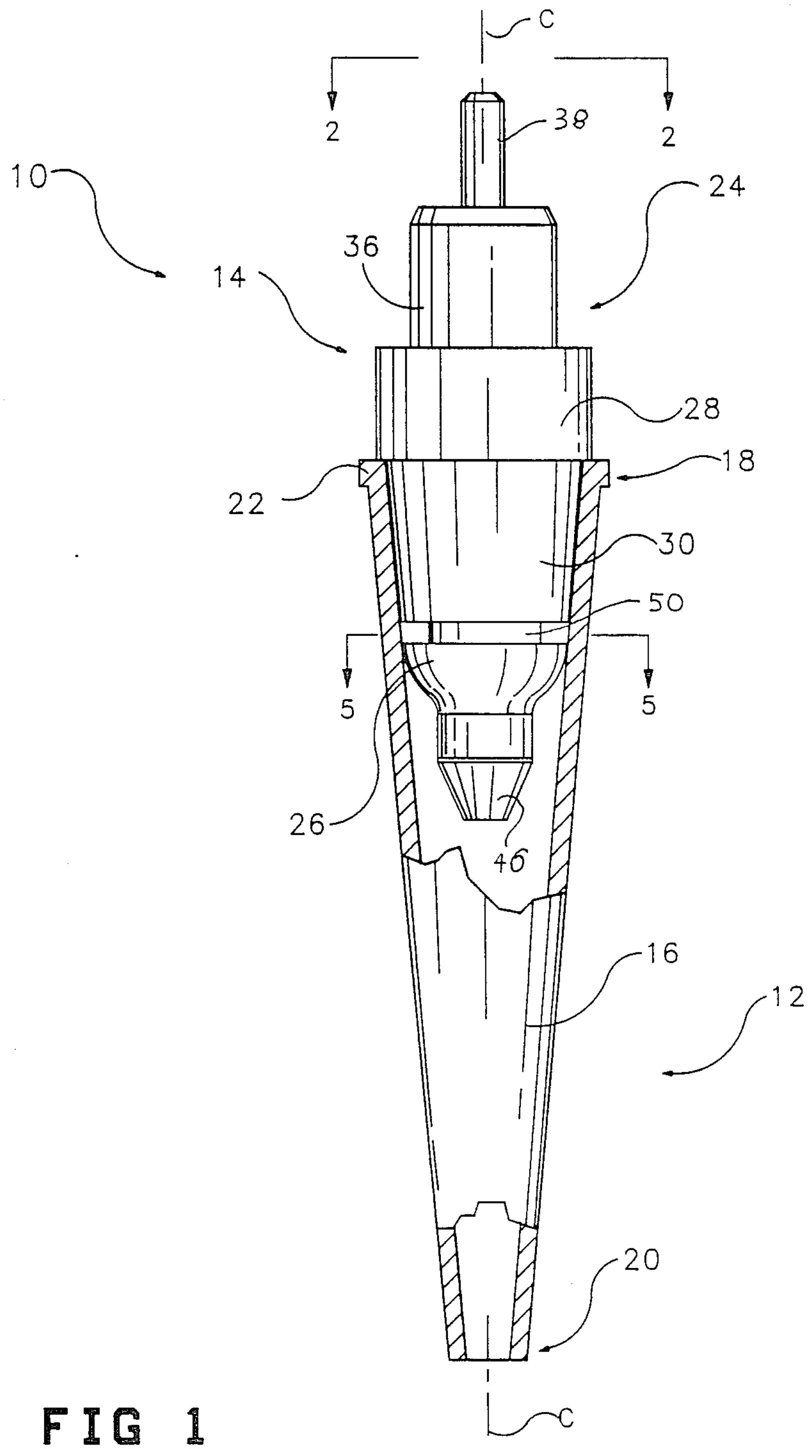
FIG. 1 is a partially broken, front elevation of a pipette assembly in accordance with the present invention.

Referring to FIG. 1, a pipette assembly 10 in accordance with the present invention includes a pipette tip 12 and a pipette tip holder 14.

The pipette tip 12 is generally made from plastic, and has an elongated, truncated, conical body portion 16 with a top end 18 and a bottom end 20. Top end 18 is provided with a flange 22 and an opening of approximately 5 millimeters (mm) in diameter, and bottom end 20 has a typical opening of 0.6 mm. The pipette tip 12 has a typical length of 5 centimeters (cm).

Figure 3:
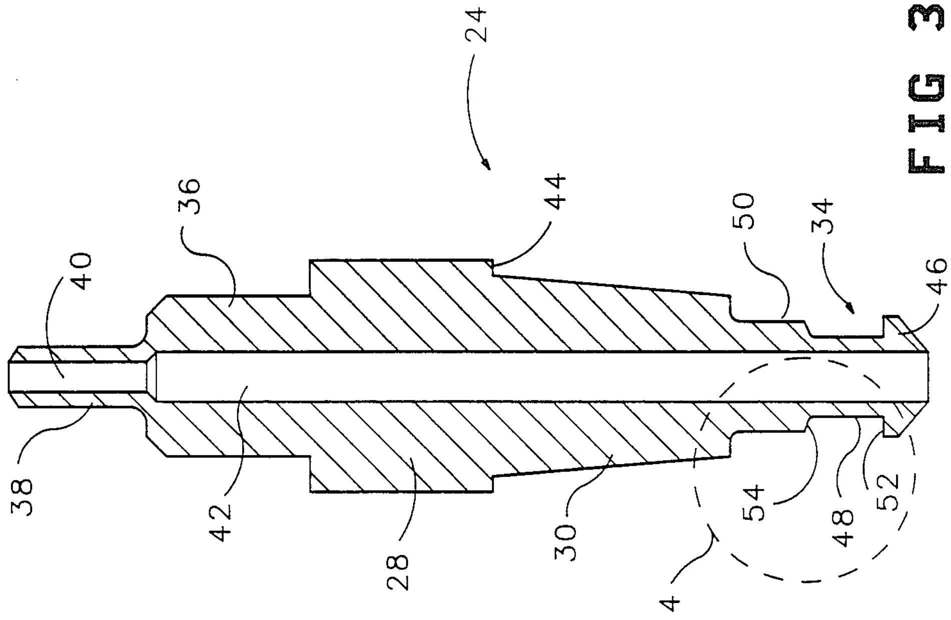
FIG. 3 is a cross-section of the mandrel taken along line 3—3 of FIG. 2.
Figure 2:
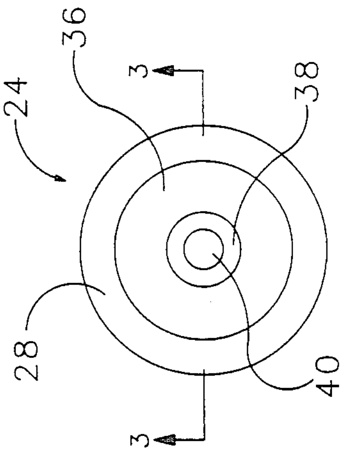
FIG. 2 is a top plan view of a mandrel as seen along line 2—2 of FIG. 1.

The holder 14 includes a mandrel 24 and a seal 26. With additional reference to FIGS. 2 and 3, the mandrel 24 includes a cylindrical central body portion 28, a conical plug portion 30, a cylindrical seating portion 34, a cylindrical upper portion 36, and an inlet portion 38. The mandrel 24 is provided with a fluid passageway including a first bore 40 and a second bore 42.

The mandrel 24 serves to hold the pipette tip 12 during use, and connects the pipette tip 12 to the remainder of the automatic pipetting machine. Typically, the mandrel 24 is made from plastic or stainless steel.

Central body portion 28 is provided with a shoulder 44 designed to engage the flange 22 of pipette tip 12. As such, the vertical position of pipette tip 12 is insured in an accurate and repeatable manner.

The plug portion 30 of mandrel 24 is designed to engage the inner surface of the conically shaped pipette tip 12. Upper portion 36 and inlet portion 38 couple the mandrel 24 to the remainder of the automatic pipetting machine.

Figure 4:
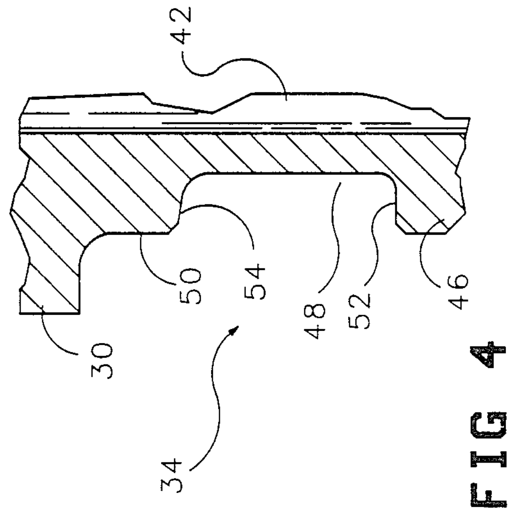
FIG. 4 is an enlarged view of a portion of the mandrel encircled by line 4 in FIG. 3.

With additional reference to FIG. 4, the seating portion 34 includes a tip section 46, a first relief section 48, and a second relief section 50. A shoulder 52 is provided at the interface between tip section 46 and first relief section 48, and a shoulder 54 is provided at the interface between first relief section 48 and second relief section 50.

Figure 6:
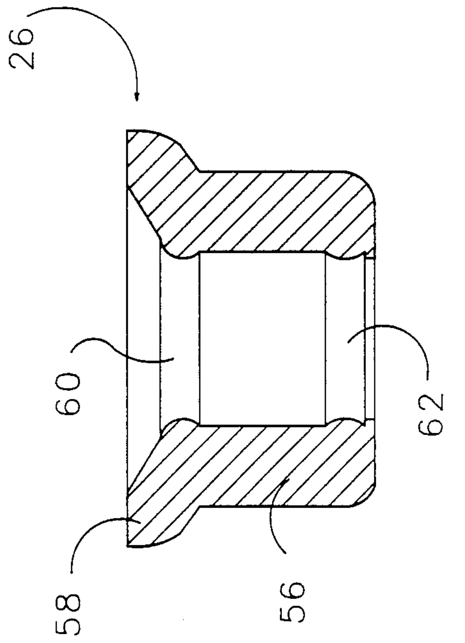
FIG. 6 is a cross-section of the seal taken along line 6—6 of FIG. 5.
Figure 5:
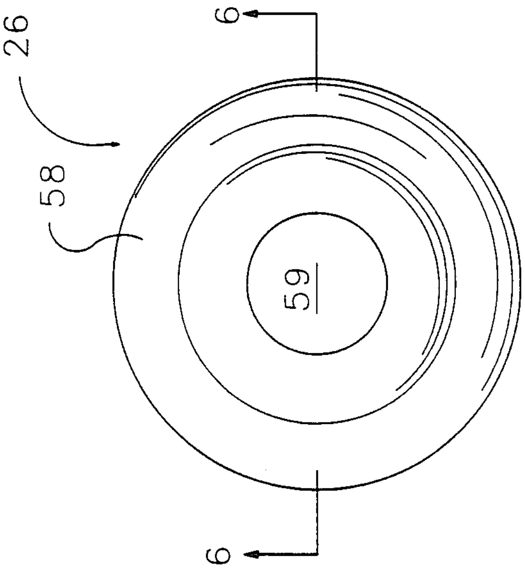
FIG. 5 is a top plan view of a seal as taken along line 5—5 of FIG. 1.

With reference to FIGS. 5 and 6, the seal 26 includes a base portion 56 a skirt portion 58, and is provided with a through opening 59. The base portion 56 includes a pair of sealing ribs 60 and 62 which engage and seal against the first relief section 48 of the seat portion 34. More specifically, sealing rib 60 is adapted to abut the shoulder 54 and the sealing rib 62 is adapted to abut shoulder 52 while simultaneously exerting an inward radial force against the cylindrical outer surface of first relief section 46.

Figure 7:
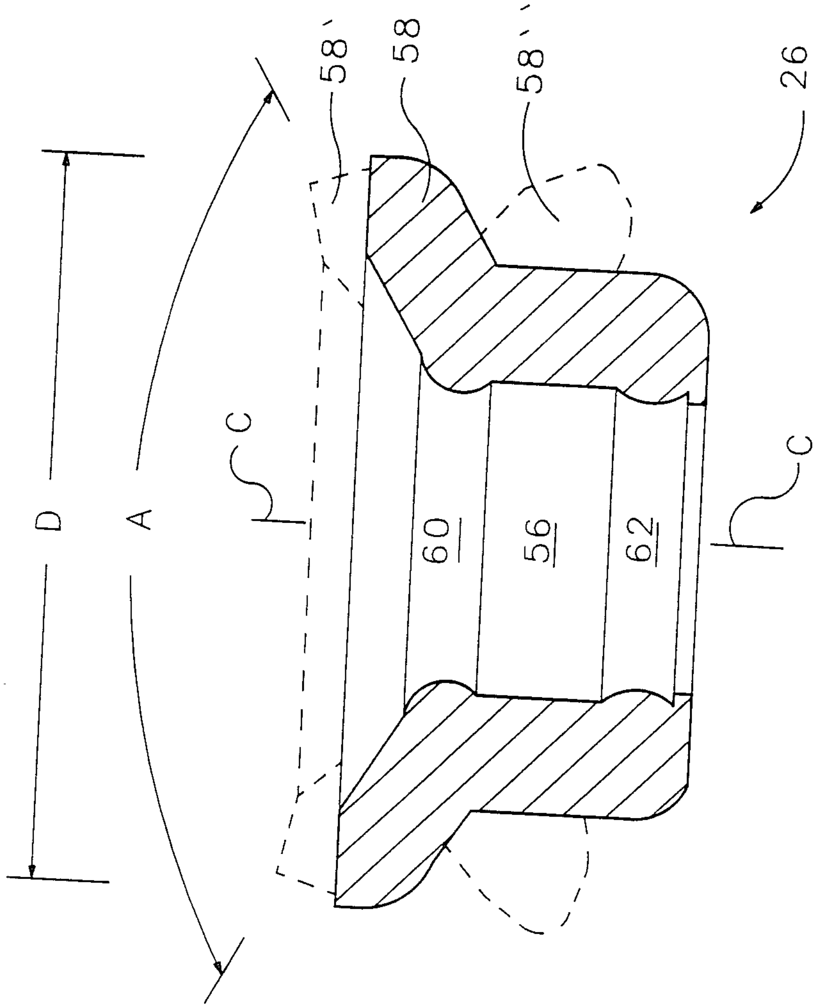
FIG. 7 is an enlarged view of FIG. 6 which is used to illustrate the sealing and release capabilities of the seal.

With additional reference to FIG. 7, the skirt portion 58 flares upwardly and outwardly from the upper end of the substantially cylindrical base portion 56. The internal angle A of the substantially conically shaped skirt portion 58 is kept relatively large, i.e., in the range of 100°–170°. In one preferred embodiment of the present invention, the internal angle A is 120°.

The seal 26 is made from a soft, resilient material such as neoprene or some other synthetic rubber substance. As will be discussed in greater detail subsequently, the soft, resilient material for the seal 26 in combination with its novel structure permits effective sealing to a large range of internal diameters D of pipette tips 12, and for the easy insertion and removal of the pipette tips 12.

With specific reference to FIG. 7, the sealing rib 60 and the wide internal angle A of the skirt portion 58 permits the seal 26 to exert a large force against the inner surface of a pipette tip 12 due to the so-called "knuckle" action. The knuckle action describes the phenomenon where a pivoting lever exerts a large, radial force when subjected to a much smaller, perpendicular force, much as a finger pivoting around a knuckle exerts a large, radial force just before it is straightened. Therefore, when the skirt portion 58 is deformed slightly as shown at 58' during its insertion into a pipette tip 12, the normal force which would tend to urge the skirt 58 to return to its unstressed position causes a large radial force to be exerted against the inner surface of the pipette tip 12 as the skirt 58' attempts to rotate around the pivot or "knuckle" of sealing rib 60. It should be noted that this knuckle action decreases rapidly as the internal angle A decreases.

The design of the seal 26 also serves to insure the concentricity of the pipette tip 12 around the central axis C of the pipette assembly 10. This is accomplished by a combination of the sealing ribs 60 and 62, which causes the base portion 56 of the seal 26 to be accurately, concentrically aligned with the first relief section 48 of mandrel 24, and by the large, radial force exerted by skirt 58 due to the aforementioned "knuckle" action.

Because the seal 26 is made from a soft, resilient material, the skirt portion 58 has a broad range of compliance to the internal diameter D of the pipette tips 12. Furthermore, the soft, resilient material of seal 26 permits easy insertion of the holder 14 into the pipette tips 12, and for the easy release of the pipette tips 12 by a flipping action of the skirt 58 to a position 58". Once the pipette tips 12 have been removed from the holder 14, the skirt 58 will return to its normal, unstressed configuration as shown at 58.

In use, the mandrel 24 is engaged with an outlet of an automatic pipetting machine (not shown). The seal portion 26 is engaged with the first relief section 48 of the mandrel 24 with the skirt section 58 flaring upwardly. The holder 14 can then pick a disposable pipette tip 12 by exerting a downward force on the holder 14 until the flange 22 of the pipette tip 12 engages the shoulder 44 of the mandrel 24 and plug portion 30 and seal 26 firmly engage the inner surface of the pipette tip 12. Fluid can then be dispensed from the pipette tip 12 after it flows through inlet portion 38, bores 40 and 42, and out of tip section 46. Once the pipetting has been completed, the pipette tip 12 can be automatically removed from the holder 14 and discarded.

While this invention has been described with reference to a single preferred embodiment, it is contemplated that various alterations and permutations of the invention will become apparent to those skilled in the art upon a reading of the preceding descriptions and a study of the drawing. It is therefore intended that the scope of the present invention be determined by the following appended claims.

What is claimed is:

1. A pipette assembly comprising:

a hollow pipette tip having a top end and a bottom end; and a holder including:

a mandrel having a top end and a bottom end and a through fluid passageway extending between said top end and said bottom end, said mandrel including a plug portion constructed and arranged to engage a top end portion of said pipette tip; and a removable seal provided with a through opening receptive to said mandrel, said seal having a base portion constructed and arranged to engage said mandrel and a skirt portion constructed and arranged to engage and seal against said top end portion of said pipette tip, such that said plug portion and said skirt portion cooperate to hold said pipette tip;

whereby fluid may flow through said mandrel and out of said pipette tip.

2. A pipette assembly as recited in claim 1 wherein said mandrel is provided with a shoulder above said plug portion which is constructed and arranged to engage said top end of said pipette tip, whereby said shoulder serves as a stop for said pipette tip by limiting upward movement thereof.

3. A pipette assembly as recited in claim 2 wherein said pipette tip is substantially configured as a hollow, inverted, truncated cone.

4. A pipette assembly as recited in claim 1 wherein said mandrel is provided with a substantially cylindrical seat portion proximate said bottom end, whereby said base portion of said seal is constructed and arranged to engage said seat portion.

5. A pipette assembly as recited in claim 4 wherein said base portion is substantially cylindrical.

6. A pipette assembly comprising:

a hollow pipette tip having a top end and a bottom end; and a holder including:

a mandrel having a top end and a bottom end, a through fluid passageway extending between said top end and said bottom end, and a substantially cylindrical seat portion proximate said bottom end; and a seal provided with a through opening receptive to said mandrel, said seal having a substantially cylindrical base portion constructed and arranged to engage said seat portion of said mandrel and a skirt portion constructed and arranged to engage and seal against a top end portion of said pipette tip, wherein said base portion is provided with a plurality of sealing ribs on an inner surface thereof which are constructed and arranged to engage and seal against said seat portion, such that said skirt may engage an inner wall of said hollow pipette tip with a knuckle action by pivoting around a sealing rib which is most proximate said skirt portion;

whereby fluid may flow through said mandrel and out of said pipette tip.

7. A pipette assembly as recited in claim 6 wherein said skirt portion flares upwardly and outwardly.

8. A pipette assembly as recited in claim 7 wherein said skirt portion, when unstressed, has an included angle in the range of 100°-170°.

9. A pipette assembly comprising:

a pipette tip in the shape of a hollow, inverted, truncated cone having a widened top end and a narrowed bottom end; and a holder including:

a mandrel having a top end and a bottom end and a through fluid passageway extending therebetween; and a seal provided with a through opening receptive to said mandrel, said seal having a substantially cylindrical base portion provided with a plurality of sealing ribs on an inner surface thereof which are constructed and arranged to engage said mandrel, and a skirt portion which flares upwardly and outwardly with an unstressed, included angle in the range of 100°-170°, said skirt portion being constructed and arranged to engage and seal against a top end portion of said pipette tip with a knuckling action around the sealing rib which is most proximate said skirt portion.

10. A pipette assembly as recited in claim 9 wherein said mandrel includes a plug portion constructed and arranged to engage said top end portion of said pipette tip.

11. A pipette assembly as recited in claim 10 wherein said mandrel is provided with a shoulder above said plug portion which is constructed and arranged to engage said top end of said pipette tip, whereby said shoulder serves as a stop for said pipette tip by limiting upward movement thereof.

12. A pipette assembly as recited in claim 9 wherein said mandrel is provided with a substantially cylindrical seat portion proximate said bottom end, whereby said base portion of said seal is constructed and arranged to engage said seat portion.

* * * * *